Figure 1:
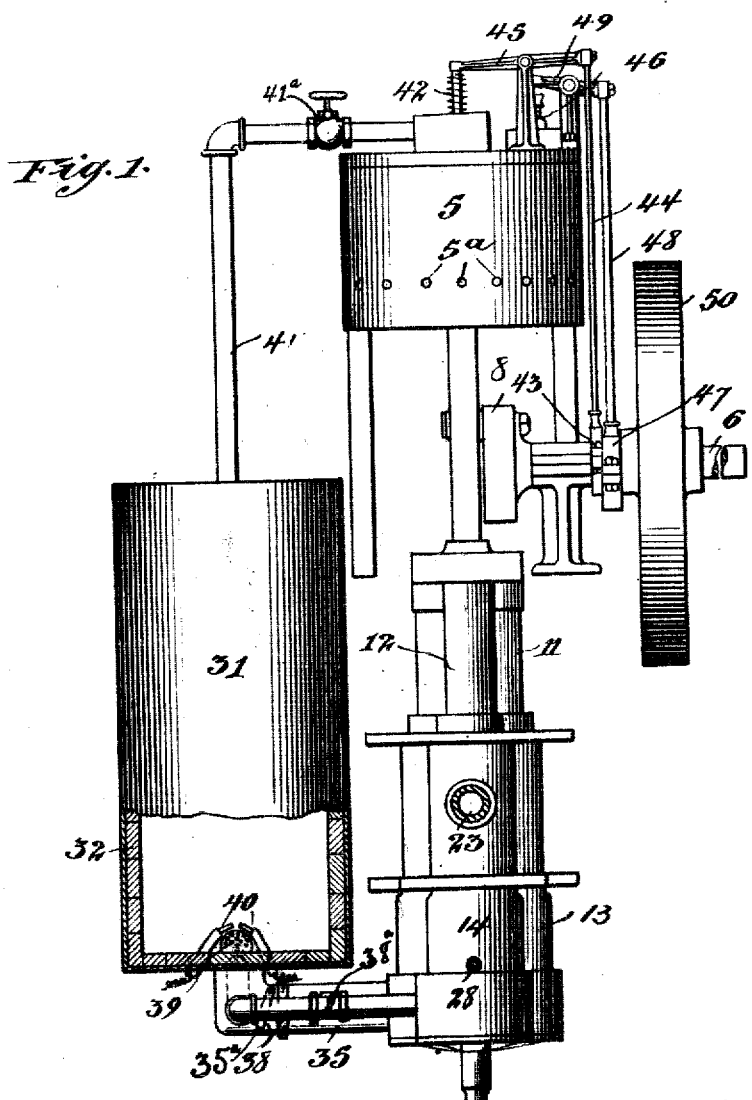

No. 814,237. PATENTED MAR. 6, 1906.
L. G. SELOVER.
SYSTEM OF POWER GENERATION.
APPLICATION FILED MAR. 6, 1902.

3 SHEETS—SHEET 1.

Witnesses.
Inventor,
Lee G. Selover,
By Offield, Towle & Linthicum
Attys.

No. 814,237. PATENTED MAR. 6, 1906.
L. G. SELOVER.
SYSTEM OF POWER GENERATION.
APPLICATION FILED MAR. 6, 1902.
3 SHEETS—SHEET 2.
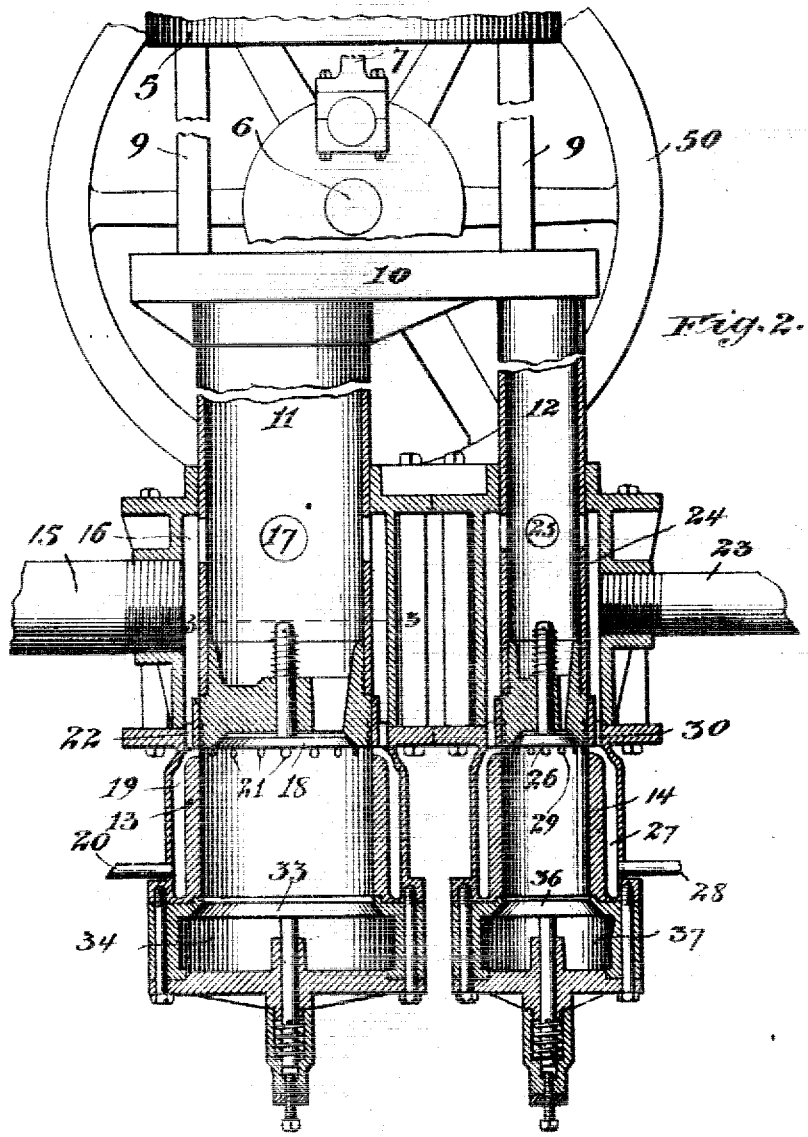

No. 814,237. PATENTED MAR. 6, 1906.
L. G. SELOVER.
SYSTEM OF POWER GENERATION.
APPLICATION FILED MAR. 6, 1902.
3 SHEETS—SHEET 3.
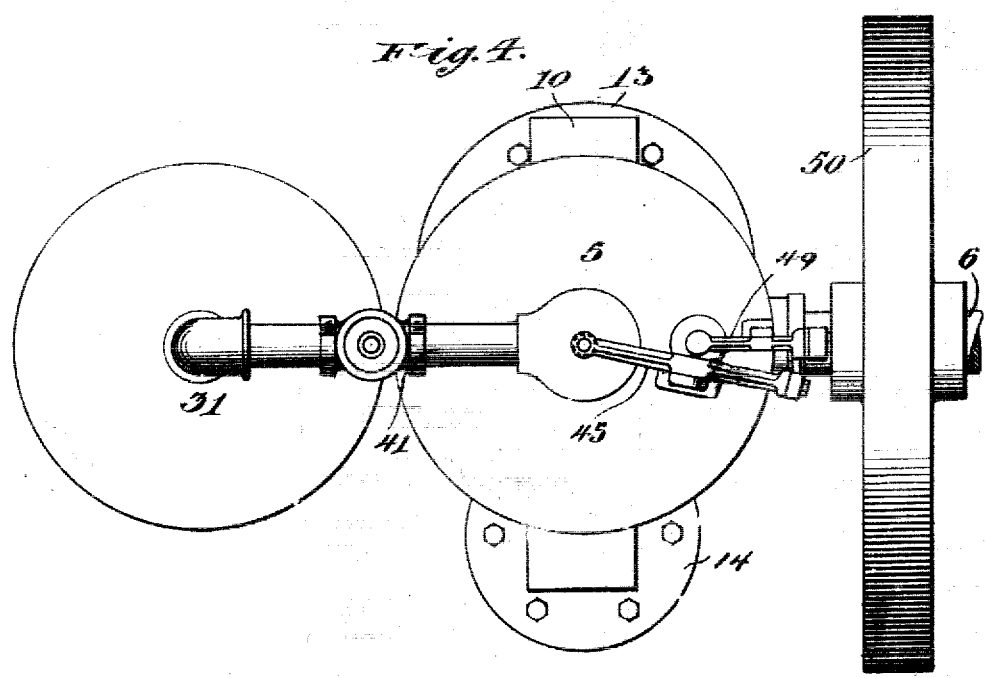

UNITED STATES PATENT OFFICE.

LEE G. SELOVER, OF WINONA, MINNESOTA.

SYSTEM OF POWER GENERATION.

No. 814,237. Specification of Letters Patent. Patented March 6, 1906.

Application filed March 6, 1902. Serial No. 96,941.

*To all whom it may concern:*

Be it known that I, LEE G. SELOVER, a citizen of the United States, residing at Winona, in the county of Winona and State of Minnesota, have invented a certain new and useful System of Power Generation, of which the following is a specification.

My invention relates to means for generating motive power through the expansion of hot gases resulting from the combustion of an inflammable gas or oil-vapor mixed with a body of air in such proportions as to produce a thorough combustion and maximum expansive effect; and my invention further relates to that type of power-generating devices of the class hereinabove referred to wherein the combustible mixture has added thereto a certain proportion of steam-vapor which serves to modify and temper the intense heat of the ignited gases, and thus render them capable of expansion and utilization in the cylinder of a reciprocating engine.

In most systems of this general class with which I am acquainted the constituents of the combustible charge have ordinarily been united before introduction to the combustion-chamber, whether this chamber has been within the expansion-cylinder of the engine or exterior thereto, this union having been effected either in the compressor or in a carbureter or mixer interposed at some convenient point between the compressing agents and the point at which the charges were fired. This has been rendered possible by the use of comparatively low pressures in which there was no danger of spontaneously igniting the mixture through the heat generated by compression. Moreover, systems of this character sometimes employ water-jackets in connection with the compressing agent and sometimes also in connection with the combustion-chamber, either with or without the use of steam-vapor in connection with the burning of the combustible charges; but so far as I am aware the heat units extracted by such water-jackets, which represent a very considerable percentage of the potential energy of the charges, have been commonly thrown away entirely or subsequently utilized in a roundabout and impracticable manner and to but a slight extent.

It is obvious that the general efficiency of any system of power generation is almost directly proportional to the conservation and utilization of the heat units that may be developed in the preparation and consumption of the motive agent; and the primary object and purpose of my invention may be generally stated to be the attainment of a greater thermal efficiency than in any other known system employing combustible mixtures. In carrying out this object I employ comparatively high pressures in the preparation for combustion of the motive agent, and in view of the fact that in the attainment of the best results it may be that such pressures will be employed as would endanger spontaneous ignition if compression were effected in a single cylinder I prefer to eliminate such a contingency by employing separate compression-cylinders for the air and fuel, the same to be brought into conjunction only at a point where it desired to effect a union and combustion. The employment of high pressures in the compression of the components of the charges necessarily generates a large amount of heat in the compressed components and in the walls of the compressors, which heat stands for a very considerable proportion of the power or energy expended in effecting the compression. The employment of water as a cooling medium in conjunction with a system of this type therefore appears to be necessary in order to maintain the compressors and working parts at an operative temperature. It is important that the heat absorbed by this water be utilized, and in order to realize this object it becomes necessary to maintain a temperature and pressure at which this water under favorable conditions of contact with the heated parts will be transformed to steam. This I effect in the preferred embodiment of my invention by water-jacketing the compressors and then entraining the water from the cylinder-jackets through and in contact with the piston and hot walls of the cylinders, whereby an increased amount of heat is taken up and by the conversion of the water into steam is carried along with the compressed components of the charge into the combustion-cylinder.

In the accompanying drawings I have illustrated a form of apparatus embodying the underlying principle of my invention, though representing but one out of many forms in which the theory of my invention might be carried into practical effect.

In the drawings, Figure 1 is a side elevation of the apparatus complete. Fig. 2 represents a front elevation of the same with the combustion-chamber removed and the compressors shown in central longitudinal section. Fig. 3 is a transverse plan section on the line 3 3 of Fig. 2, and Fig. 4 is a top plan view of the apparatus complete.

In the drawings, 5 designates a single acting expansion-engine designed to utilize the resulting products of combustion generated as hereinafter described, this cylinder having a reciprocating piston (not shown) connected to a main engine-crank 6 by an ordinary pitman 7 and crank-disk 8. The piston of the expansion-cylinder is connected by a pair of rigid vertically-depending connecting-rods 9 to a scotch cross-head 10, from which latter depend a pair of parallel trunk-pistons 11 and 12, pertaining, respectively, to a pair of cylinders 13 and 14, the former being intended for the compression of air and the latter for the simultaneous compression of the fuel employed in the charge. Air is admitted to the compressor 13 through a pipe 15, which taps an annular chamber 16, surrounding the hollow trunk-piston 11, the air entering the latter from the annular chamber freely through a series of openings 17, which are always in free communication with the chamber 16. From the hollow trunk or stem of the piston the air freely passes on the upward or suction stroke past a valve 18 into the chamber of the cylinder. The compressor-cylinder 13 is equipped with an annular chamber 19, extending the full length thereof to constitute a water-jacket. This chamber is tapped at or near its lower end by a water-inlet pipe 20, while its upper end communicates freely with an annular series of apertures 21, leading to the interior of the cylinder-chamber, while another annular series of vertical apertures 22 connect the upper end of the water-jacket with the lower end of the annular air-receiving chamber 16.

It will be observed that the fuel-compressor is constructed and equipped in a manner substantially identical with the air-compressor, as already described, with the single difference that it is of considerably smaller size and capacity. Referring briefly to its constituent elements, 23 indicates the gas-inlet pipe, which laterally taps an annular chamber 24, surrounding the hollow trunk or stem of the fuel-compressor piston, which latter is provided with the apertures 25 and valve 26, whereby on the suction-stroke the fuel is introduced into the cylinder-chamber. An annular chamber 27 surrounds the fuel-cylinder 14 to serve the office of a water-jacket, this chamber being tapped at or near its lower end by a water-inlet pipe 28 and communicating at its upper end by a series of lateral apertures 29 with the interior of the cylinder and by a corresponding series of vertical apertures 30 with the lower end of the annular fuel-chamber 24.

31 designates a combustion-chamber, which may conveniently be located between and behind the compressors. This chamber is designed to receive the highly-compressed components constituting the combustible motive agent for the purpose of firing the latter therein preparatory to their use expansively in the engine-cylinder 5. For this purpose the chamber 31 is made of a suitable size to retain several successive charges applied thereto by the compressors and permit the expanding gases to be drawn therefrom by the engine-cylinder in a substantially uniform supply and at a substantially uniform pressure. In order to enable the chamber to withstand the high pressure and temperature to which it is subjected, it is made of material possessing the requisite pressure-resisting strength and is lined interiorly with fire-clay or other heat-resisting substances, (indicated at 32.)

A puppet-valve 33, preferably having a surface area coextensive with the transverse area of the air-compressor cylinder 13, guards the lower end of the latter, the charges from said cylinder escaping past said valve into the chamber 34 in the underlying cylinder-head, which chamber constitutes part of a discharge-conduit 35, leading thence into and through the bottom wall of the combustion-chamber 31. A similar puppet-valve 36 closes the entire lower end of the fuel-compressor cylinder 14, past which the compressed fuel escapes into a chamber 37 in the cylinder-head constituting part of a conduit 38, also leading into the combustion-chamber through its lower end. As shown in Fig. 1, the fuel-conduit 38 preferably taps the air-conduit 35 at a point slightly below the junction of the latter with the combustion-chamber, passing up thence inside of and coaxially with the air-conduit and terminating at its upper end in a spraying-nozzle 39, adapted to spray and disperse the fuel in a finely-divided condition into intimate contact with the entering air and steam surrounding the same. The conduits 35 and 38 may be equipped with check-valves, indicated at 35ª and 38ª, respectively, preferably located as near the combustion-chamber as possible. At 40 I have indicated a conventional form of electric sparker for initially igniting the admitted charges at the commencement of the engine's operation.

From the top of the combustion-chamber 31 a discharge-pipe 41 serves to conduct the heated products of combustion under high tension to the engine-cylinder 5, the motive fluid being admitted to the latter preferably through an ordinary balanced puppet-valve, the stem of which is indicated at 42, which valve may be actuated at the proper intervals from an eccentric 43 on the main shaft through a connecting-rod 44 and a rocker-arm 45. The pipe 41 is preferably supplied with a throttle-valve 41ª, by which the supply of motive fluid to the engine may be reduced or cut off entirely, as desired. At 46 I have indicated the presence of an exhaust-valve which may also be operated in its proper turn from an eccentric 47 on the engine-shaft and a connecting-rod 48 and rocker-arm 49. As hereinabove stated, the engine-cylinder herein shown is a single-acting cylinder, and in order to secure the discharge of the bulk of the exhaust promptly at the termination of the working stroke I provide the cylinder with an annular series of radial apertures 5ª, located therein at a point just above the lowermost point of the piston's travel. The return of the engine-piston and the plungers of the compressors is effected by momentum stored in a fly-wheel 50, fast on the main shaft 6. This riddance of the bulk of the exhaust through the openings 5ª instantly upon the termination of the working stroke relieves the engine-piston of the work of forcing out and expelling all but a small residuum of the exhaust through the discharge-valve 46.

The operation may be briefly described as follows: The engine is initially started by imparting a few turns of the shaft 6 either by hand through the fly-wheel 50 or by the use of a small auxiliary motor. Air and fuel are thereupon simultaneously drawn into the cylinders of the air and fuel pumps and on the descent of the plungers therein are forced through the discharge-pipes 35 and 38 into the lower end of the combustion-chamber 31, in which latter they are ignited by the sparker 40 and are permitted to burn with a consequent rapid generation of both heat and expansive energy, the check-valves 35ª and 38ª serving the purpose of aiding in preventing a tendency to "back-firing" and creating a slight retardation of the entering constituents. The products of combustion thus generated in the chamber 31 immediately pass by the pipe 41 and inlet-valve 42 into the engine-cylinder 5 and expanding therein force the piston thereof downwardly, thereby aiding in the compression of the subsequent charges. After a few turns of the shaft a sufficient volume of motive fluid is generated in the combustion-chamber to supply the engine at full-working volumes and pressures, whereupon the subsequent operation of the apparatus becomes entirely automatic. As the operation continues the temperature and pressure of the burning gases in the chamber 31 rapidly increase to a high point, and since this increasing pressure is effective not only on the piston of the engine-cylinder, but against the check-valves 35ª and 38ª, the components of the charge are delivered to the combustion-chamber at rapidly-increasing pressures until a maximum pressure of approximately three hundred (300) pounds is designed to be attained, it appearing probable that such a pressure must be approximately a maximum, since the difficulties for mechanical reasons that would arise would preclude operation at a much greater pressure. It is difficult to determine the exact pressure at which the best results will be attained; but it seems quite unlikely that the minimum will be lower than that at which spontaneous combustion would result if compression of both constituents were effected in a single cylinder It may be here remarked that another important advantage resulting from the employment of separate compression resides in the elimination thereby of all danger of firing or burning back of the charge before it has reached the combustion-chamber proper. This latter is an ever-present danger where combined compression of the components of the charge is effected, even at comparatively low pressures, and of course is present in a greater degree where higher pressures are employed. The entire freedom from this danger, which my hereinabove-described method and means of effecting compression of the charge secures, I regard as an important feature of my invention.

At such working pressures as those indicated above the cylinders of both the compressors become highly heated, and to maintain these cylinders at operative temperatures, as well as to conserve and utilize the heat units represented thereby, I admit cooling-water to the cylinder-jackets through the pipes 20 and 28 at the lower ends thereof, which water rises through the jackets, abstracting a considerable portion of the heat from the cylinders, and is entrained into the latter through the lateral apertures 21 and 26 at the upper ends of the cylinders, and flows thence down over the interior walls of the cylinders, serving to a certain extent to lubricate the latter, but having its principal function in the further abstraction of heat, in which operation the water becomes converted into highly-heated steam-vapor and passes over with the air and fuel into the combustion-chamber, adding its heat to the heat of the burning and expanding products of combustion in the latter. This employment of such high working pressures as will afford sufficient heat to vaporize the jacket-water and still render the compressors sufficiently cool to be operative and the conservation of the heat generated in the components of the charges by the means and in the way described and shown is believed to give the best results in the direction of maximum thermal efficiency and constitutes an important novel characteristic of my invention.

I believe I am the first to secure the conservation of the heat units created in connection with the compression of the combustible charge by a power-generator operating in substantially the manner hereinabove described and employing a cooling medium which is brought into such intimate contact with the heated parts of the compressing agent as to practically abstract all the heat therefrom and is further caused to unite with the charge itself and pass therewith over into the combustion-chamber, securing, as an important auxiliary result, the constant maintenance of the compressing agent in efficient working condition. I believe I am also the first, in connection with the employment of relatively high pressures, to employ separate compressors each equipped with heat abstracting and conveying means as above described for the separate compression of the components of the charge, thereby effecting the distinct advantage of eliminating entirely all danger of burning or firing back on the part of the combustible mixture. I do not, therefore, limit myself to the precise construction or arrangement of apparatus herein shown and described, nor to the illustrated relative proportions of the several parts, since it is obvious that the novel operations performed in carrying out my invention might be effected through the use of other forms of apparatus for effecting the separate compression of the air and fuel for uniting and burning the latter and for utilizing its expansive effect for the production of power.

I claim—

1. In an apparatus for generating motive power, the combination with a combustion-chamber, of separate air and fuel compressors connected therewith, and means in association with said compressors for conserving the heat of compression generated therein by a heat-absorbing fluid and transferring the vapor created thereby to the combustion-chamber along with the components of the combustible charge, substantially as described.

2. In an apparatus for generating motive power, the combination with a combustion-chamber, of separate air and fuel compressors adapted to operate at high pressures connected therewith, water-jackets applied to said compressors to absorb the heat of compression and maintain the compressors at operative temperatures, and means for transferring the jacket-water in the form of steam-vapor to the combustion-chamber, substantially as described.

3. In an apparatus for generating motive power, the combination with a combustion-chamber, of separate air and fuel compressors adapted to operate at high pressures connected therewith, and water-jackets surrounding the cylinders of said compressors and communicating with the interiors thereof, whereby the jacket-water may be entrained through the cylinders, absorbing the heat of compression therefrom and passing in the form of steam-vapor with the compressed air and fuel into the combustion-chamber, substantially as described.

4. In an apparatus for generating motive power, the combination with a combustion-chamber, of separate air and fuel compressors adapted to operate at high pressures connected therewith, water-jackets surrounding the cylinders of said compressors, means for supplying water to one end of said jackets, means for entraining the jacket-water from the opposite end of the jackets through the cylinders, an engine, and means for supplying the latter with motive fluid from the combustion-chamber, substantially as described.

5. In an apparatus for generating motive power, the combination with a combustion-chamber, of separate air and fuel compressors adapted to operate at high pressures connected therewith, water-jackets surrounding the cylinders of said compressors, means for supplying water to one end of said jackets, means for entraining the jacket-water from the opposite end of the jackets through the cylinders, means for initially firing the compressed charge in the combustion-chamber, an engine, and a supply-pipe leading thereto from the combustion-chamber, substantially as described.

6. In an apparatus for generating motive power, the combination with a combustion-chamber, of separate air and fuel compressors adapted to operate at high pressures discharging thereinto, water-jackets surrounding the cylinders of said compressors, means for supplying water to said jackets and for entraining the jacket-water therefrom through the cylinders wherein it is converted into steam-vapor by the heat of compression, an engine, a supply connection from the combustion-cylinder to said engine, and operating connections from the plungers of the compressors to a moving part of the engine, substantially as described.

7. In an apparatus for generating motive power, the combination with a combustion-chamber, of separate air and fuel compressors adapted to operate at high pressures discharging thereinto, water-jackets surrounding the cylinders of said compressors, means for supplying water to said jackets and for entraining the jacket-water therefrom through the cylinders wherein it is converted into steam-vapor by the heat of compression, an engine longitudinally alined with said compressors, a scotch cross-head to which the plungers of the compressors are attached, and connecting-rods intermediate said scotch cross-head and the piston of the engine-cylinder, substantially as described.

8. In an apparatus for generating motive power, the combination with a combustion-chamber, of separate air and fuel compressors adapted to operate at high pressures discharging thereinto, water-jackets surrounding the cylinders of said compressors, means for supplying water to said jackets and for entraining the jacket-water therefrom through the cylinders wherein it is converted into steam-vapor by the heat of compression, an engine longitudinally alined with said compressors, a scotch cross-head to which the plungers of the compressors are attached, connecting-rods intermediate said scotch cross-head and the piston of the engine-cylinder, and a crank and fly-wheel also connected to and driven by the piston of the engine-cylinder, substantially as described.

LEE G. SELOVER.

Witnesses:
M. B. WEBBER,
MARGARET A. WARREN.